United States Patent

Geissbühler

[11] Patent Number: 6,063,739
[45] Date of Patent: May 16, 2000

[54] PLASTIC SKI COATING

[75] Inventor: Urs Geissbühler, Thun, Switzerland

[73] Assignee: INS Kunststoff AG, Ittigen-Bern, Switzerland

[21] Appl. No.: 09/312,493

[22] Filed: May 17, 1999

[30] Foreign Application Priority Data

May 18, 1998 [EP] European Pat. Off. ............. 98109011

[51] Int. Cl.$^7$ ................... C10M 107/04; C10M 125/18; A63C 5/00
[52] U.S. Cl. .................. 508/106; 524/424; 280/601; 280/610
[58] Field of Search ............... 508/106; 524/424

[56] References Cited

U.S. PATENT DOCUMENTS

| | | | |
|---|---|---|---|
| 5,587,110 | 12/1996 | Yamana et al. | 252/511 |
| 5,914,298 | 6/1999 | Karydas | 508/106 |
| 5,998,339 | 12/1999 | Kato et al. | 508/106 |

FOREIGN PATENT DOCUMENTS

| | | |
|---|---|---|
| 0 821 030 | 1/1998 | European Pat. Off. . |
| 28 25 406 | 12/1978 | Germany . |
| 657 993 | 10/1986 | Switzerland . |

OTHER PUBLICATIONS

International Search Report for EP 98–10–9011.
Database WPI, Section Ch, Week 9330, Derwent Publications Ltd., London, GB; Class A86, AN 93–239303 XP002080324 & JP 05 161736A (Kikkiso Co Ltd) Jun. 29, 1993, Zusammenfassung.

*Primary Examiner*—Ellen M. McAvoy
*Attorney, Agent, or Firm*—Shoemaker and Mattare, Ltd

[57] ABSTRACT

The plastic ski coating contains a filling material mixture of fluorographite and soot. By way of this combination the sliding characteristics of the coating on snow is surprisingly improved.

6 Claims, No Drawings

PLASTIC SKI COATING

The invention relates to a plastic ski coating with a filling material mixture for improving the sliding characteristics.

For plastic ski coatings preferably materials with a hydrophobic character are applied, in particular polyethylene.

The sliding procedure which forms the basis for sliding on snow and ice with skis, to which also snowboards must be counted, is very complex and is not known in every detail. However it has been shown that as a result of the friction between the running surface material on the one side and the snow crystals on the other side by way of the resulting frictional heat snow crystals locally melt and that water formed at the same time leads to hydrodynamic lubrication relationships. By way of this the low kinetic friction coefficients of 0.02 to 0.05 measured on skiing may be explained. The kinetic friction coefficients measured with solid body friction lie roughly 10 times higher.

It is also known that with higher speeds the locally formed melted water may extend over the whole running surface which leads an undesirable "suction effect" which negatively influences the sliding speed. With the admixture of materials such as for example carbon in the modifications soot and/or graphite, which with respect to the non-modified polyethylene have a higher heat conductability, this negative effect may be prevented or reduced (cf. e.g. CH-A-657993 or CH-A-660018).

The document EP-A-0821030 describes low-friction material of polyethylene with admixtures of fluorographite of the formula $CF_n$, wherein n may vary from 0.5 to 1.3. Measurements of press-sintered probes of polyethylene with 10 to 30% CF against steel in accordance with ASTM D3702 resulted in kinetic coefficients of friction of 0.27 to 0. 13, in comparison to 0.35 for polyethylene against steel. In EP-A-082 1030 also the use of such materials for ski coatings is suggested. Since as has been previously explained with the sliding of skis on snow a hydrodynamic lubrication is present, it may not however be assumed without further ado that ski coatings of such materials on sliding on snow would have a reduced friction. Measurements with real skis using the materials of polyethylene with fluorographite as ski coatings, as described in the examples of EP-A-0821030 have shown that fluorographite as an additive in polyethylenes result in no significant reduction of the friction or increase in the sliding speed.

It has now been surprisingly found out that mixtures of fluorographite with soot as an additive to polyethylene partly markedly reduce the friction of skis on snow or increase the sliding speed.

The plastic ski coating according to the invention of above mentioned type is therefore characterised in that the filling material mixture contains fluorographite and soot.

The plastic may usefully be press-sintered plastic powder or plastic granulate, preferably of polyethylene, in particular low-pressure polyethylene with a molar mass of 4 to $12 \times 10^6$ g/mol. For 100 parts by weight of plastic it may contain 0.5 to 10, preferably 3 to 8 parts by weight of fluorographite and 5 to 30, preferably 10 to 20 parts by weight of soot. The fluorographite may have the formula $CF_n$, wherein n lies between 0.5 and 1.3.

EXAMPLE

In a first phase an intimate mixture of 15 parts by weight of soot with 20 nm particle size and an oil requirement of 500% and 5 parts by weight of fluorographite was manufactured.

In a second phase the thus manufactured mixture of soot and fluorographite is intimately mixed with 85 parts by weight of the ultra high molecular low-pressure polyethylene Hostalen GUR 4170, molecular molar mass $10.5 \times 10^6$ in a mixer 15 minutes long and afterwards press-sintered into a homogeneously cylindrical sintered body with the known heat and pressure conditions (such as is e.g. specified in the brochure of Hoechst for its low-pressure polyethylene "Hostalen GUR" [brochure HKR112-7089C12299/14]. After cooling, from the cylindrical sintered body an endless strip in the desired thickness of the ski coating of e.g. 1.4 mm is peeled off. The ski coating afterwards in the known manner and way is roughened on one side with an abrasive strip and is pretreated by an oxidising flame, for adhesing onto the ski body.

Of course the ski coating may not only be manufactured with the press-sintering method with a subsequent peeling, but for example also with the extrusion method. Essential to the invention is the admixture of an additive consisting of a mixture of soot and fluorographite.

COMPARATIVE EXAMPLE A

Not According to the Invention

Analogous to Example 1 100 parts by weight of the mentioned Hostalen GUR 4170 were mixed with 5 parts by weight of fluorographite CF in a mixer for 15 minutes and as described in Example 1 processed into a ski running surface.

COMPARATIVE EXAMPLE B

Not According to the Invention

Analogous to Example 1 85 parts by weight of the mentioned Hostalen OUR 4170 were mixed with 15 parts by weight of soot (particle size 20 nm, oil requirement 500%) in a mixer for 15 minutes and as described in Example 1 processed into a ski running surface.

Measurement results

A test path with skis of identical design which differ by the coating used was travelled with an average speed of 100 km/h and the time required for this was acquired by way of electronic time measurement. On new snow at a temperature of −3° C., at air temperatures of −2.5 to −3.5° C. and air humidities of 70 to 85% the following times were measured:

| Running surface according to Example | Composition of the running surface [parts by weight] | Measured time | Sliding time in % |
|---|---|---|---|
| 1 | PE [85] C [15] CF [5] | 22,862 sec | 93.8 |
| A | PE [100] CF [5] | 24,380 sec | 100 |
| B | PE [85] C [15] | 23,809 sec | 97.7 |

I claim:

1. A plastic ski coating with a filling material mixture for improving the sliding characteristics, characterised in that the filling material mixture contains fluorographite and soot.

2. A plastic ski coating according to claim 1, characterised in that the plastic is a press-sintered plastic powder or plastic granulate.

3. A plastic ski coating according to claim 1, characterised in that the plastic is polyethylene.

4. A plastic ski coating according to claim 3, characterised in that the plastic is low-pressure polyethylene with a molar mass of 4 to $12 \times 10^6$ g/mol.

5. A plastic ski coating according to claim 1, characterised in that for 100 parts by weight of plastic it contains 0.5 to 10, preferably parts by weight of fluorographite and 5 to 30, parts by weight of soot.

6. A plastic ski coating according to claim 1, characterised in that the fluorographite has the formula $CF_n$, wherein n lies between 0.5 and 1.3.

* * * * *

UNITED STATES PATENT AND TRADEMARK OFFICE
CERTIFICATE OF CORRECTION

PATENT NO. : 6,063,739
DATED : May 16, 2000
INVENTOR(S) : Urs Geissbuhler

It is certified that error appears in the above-identified patent and that said Letters Patent is hereby corrected as shown below:

-- Assignee: IMS Kunststoff AG --

Signed and Sealed this

First Day of May, 2001

Attest:

NICHOLAS P. GODICI

Attesting Officer      *Acting Director of the United States Patent and Trademark Office*